P. MOEWS.
NOSE GUARD.
APPLICATION FILED SEPT. 11, 1908.
985,434.
Patented Feb. 28, 1911.
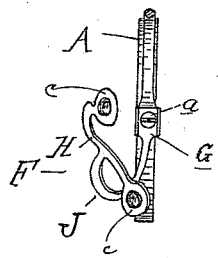
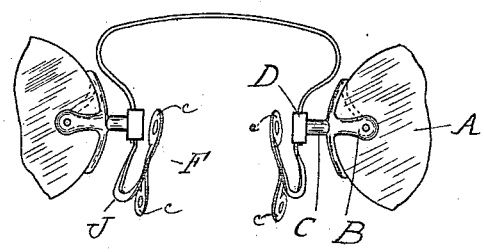
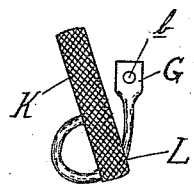
Witnesses
Inventor
Paul Moews

UNITED STATES PATENT OFFICE.

PAUL MOEWS, OF DETROIT, MICHIGAN.

NOSE-GUARD.

985,434.  Specification of Letters Patent. Patented Feb. 28, 1911.

Application filed September 11, 1908. Serial No. 452,629.

*To all whom it may concern:*

Be it known that I, PAUL MOEWS, a citizen of the United States of America, residing at Detroit, in the county of Wayne and State of Michigan, have invented certain new and useful Improvements in Nose-Guards, of which the following is a specification, reference being had therein to the accompanying drawings.

The invention relates to a nose guard for eye-glasses, and has for its object the production of a guard of this character capable of being readily adjusted in angular relation to or toward or away from the lenses to accommodate the eyeglass to the face of the wearer, and to this end it consists in the novel and simple construction of the nose guard, in the peculiar arrangement and combination of its parts, and in certain details of construction as more fully hereinafter described.

In the drawings illustrating my invention,—Figure 1 is a view in front elevation of a pair of eyeglasses with my improved nose guard applied; Fig. 2 is a sectional view taken transversely through the bridge in Fig. 1; and Fig. 3 is an enlarged view of a modified form of guard detached.

In the drawings thus briefly described, A represents the lens, B the usual clip, C the stud, and D the box.

F designates my improved nose guard adapted to be secured within the box in the usual manner by a suitable screw, as $a$, the guard being provided with an attaching portion or end G, centrally apertured, as at $b$, to permit of the entry therethrough of the fastening device.

In construction, the guard comprises the attaching portion described, a guard proper H, and a uniting section J connecting the attaching portion with the guard proper at a point intermediate the ends of the latter, as shown.

In Figs. 1 and 2 the guard has a curved upper portion and its extremities are enlarged to receive suitable pads, as $c$, while in Fig. 3 the guard proper is straight, as indicated at K, while the pad or bearing L extends throughout its length. In each case the guard proper is elongated in form, and of a length to project upon opposite sides of the uniting section.

The uniting section J is in the form of a loop extending vertically from the attaching end in the preferred form downwardly from said end, and then rearwardly of both the attaching section and of the guard, and connected to the latter preferably midway of its ends. The loop is preferably in the form of a spiral, so that in use the guard proper will lie in a plane substantially parallel with the attaching end and thus be capable of being tilted forwardly or rearwardly in the desired angular relation to the lenses. The rearwardly extending spiral loop forming the connection between the attaching portion and the guard proper permits the latter to be adjusted a maximum amount away from the lenses, or in other words permits the projection of the lenses a maximum distance from the eyes of the wearer, and its location to the rear of the lenses makes the fitting less conspicuous. Furthermore, the arrangement of the entire nose bearing upon a single guard member permits the guard to be adjusted in its entirety into the desired position in relation to the lenses, thereby reducing the time of adjustment to a minimum.

In Figs. 1 and 2 the guard is shown as formed preferably from a stamping of flat metal, the adjustment being effected by bending the guard edgewise of the material. This is not a necessary construction, however, as the guard may be formed of round metal as illustrated in Fig. 3, with flattened nose engaging and attaching sections.

What I claim as my invention is,—

1. A nose guard for eye glasses, comprising a flat apertured attaching section, an elongated single piece nose guard proper positioned at one side of said section and in a plane parallel to and rearwardly thereof, and a loop of bendable material connecting the apertured section with the nose guard proper, comprising a portion projecting vertically from said apertured section to a point adjacent one end of said elongated nose guard, and a transverse portion projecting beyond said guard, said transverse portion terminating in a return bend positioned upon the side of said nose guard opposite the flat apertured section and connecting with the guard proper at a point substantially midway of its ends.

2. A nose guard for eyeglasses, comprising a flat apertured attaching section, an elongated single piece nose guard proper of rectangular configuration positioned at one side of said section and in a plane parallel to and rearwardly thereof, and a bendable loop having a substantially circular cross-section connecting the apertured section with the nose guard proper, comprising a portion projecting vertically from said apertured section to a point adjacent one end of said nose guard, and a transverse portion projecting beyond said guard, said transverse portion terminating in a return-bend positioned upon the side of the nose guard proper opposite the flat apertured section and connecting with said guard at a point substantially midway of its ends.

3. In eyeglasses, the combination with the lenses, of a nose guard comprising a flat attaching section, an elongated single-piece nose guard proper positioned at one side of said section, and a loop of bendable material connecting the attaching section with the nose guard proper having a portion projecting vertically from the attaching section, and a transverse portion extending rearwardly from the lenses beyond the guard proper and terminating in a rebent portion connected with the nose guard proper upon the side of the latter opposite the flat attaching section.

In testimony whereof I affix my signature in presence of two witnesses.

PAUL MOEWS.

Witnesses:
A. O. LITTLE,
M. THOMSON.

Copies of this patent may be obtained for five cents each, by addressing the "Commissioner of Patents, Washington, D. C."